(12) United States Patent
Dafoe et al.

(10) Patent No.: US 8,578,093 B1
(45) Date of Patent: Nov. 5, 2013

(54) MANAGING INDICATIONS IN DATA STORAGE SYSTEMS

(75) Inventors: Deene A. Dafoe, Northborough, MA (US); Kevin S. Labonte, Upton, MA (US); Gregory W. Lazar, Upton, MA (US); Sriram Krishnan, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 126 days.

(21) Appl. No.: 13/338,131

(22) Filed: Dec. 27, 2011

(51) Int. Cl.
*G06F 12/00* (2006.01)

(52) U.S. Cl.
USPC .............................. 711/114; 711/156; 711/170

(58) Field of Classification Search
None
See application file for complete search history.

(56) References Cited

U.S. PATENT DOCUMENTS

2007/0168634 A1* 7/2007 Morishita et al. ............. 711/170

* cited by examiner

*Primary Examiner* — Shawn X Gu
(74) *Attorney, Agent, or Firm* — Krishnendu Gupta; Jason A. Reyes; Deepika Bhayana (57) ABSTRACT

A method is used in managing indications in data storage systems. A threshold value is associated with a storage object. A client subscribes to a server for receiving an indication indicating a change in a property of the storage object. A determination is made as to whether a number of indications processed by the server exceeds the threshold value. A bulk status is associated with the indication based on the determination. The indication is send to the client. The client performs an action based on the bulk status associated with the indication.

18 Claims, 9 Drawing Sheets

MANAGING INDICATIONS IN DATA STORAGE SYSTEMS

BACKGROUND

1. Technical Field

This application relates to managing indications in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used. RAID (Redundant Array of Independent or Inexpensive Disks) parity schemes may be utilized to provide error detection during the transfer and retrieval of data across a storage system (also known as storage arrays or arrays).

In a common implementation, a Storage Area Network (SAN) is used to connect computing devices with a large number of storage devices. Management and modeling programs may be used to manage these complex computing environments.

Storage Management Initiative Specification (SMI-S), and Common Information Model (CIM) technologies, are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application.

For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

Client-server computer storage configurations or networks are well known. The "client" (human user, or graphical user interface (GUI), or software module, workstation, etc.) is operatively coupled to hardware/software functionality known as the "server" which services the client by responding to client requests to store information and/or retrieve stored information. Multiple clients can be operatively coupled to multiple servers in a particular client-server network configuration.

Effective management of client-server networks is very important to ensure that the networks operate as intended and serve network users as expected. This management function may be accomplished through distributed management software which can be distributed throughout a client-server network. If a client-server network is running such software that is also object-oriented, typically many objects reside in each of the clients and/or servers. An object can send and receive messages to and from other objects, respond and react to such messages.

SUMMARY OF THE INVENTION

A method is used in managing indications in data storage systems. A threshold value is associated with a storage object. A client subscribes to a server for receiving an indication indicating a change in a property of the storage object. A determination is made as to whether a number of indications processed by the server exceeds the threshold value. A bulk status is associated with the indication based on the determination. The indication is send to the client. The client performs an action based on the bulk status associated with the indication.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing indications in data storage systems, which technique may be used to help provide for, among other things, associating a threshold value with a storage object, where a client subscribes to a server for receiving an indication indicating a change in a property of the storage object, determining whether a number of indications processed by the server exceeds the threshold value, based on the determination, associating a bulk status with the indication, and sending the indication to the client, where the client performs an action based on the bulk status associated with the indication.

In management software running within its client-server environment, there may be a group of service providers termed "providers", which are delegated specific managerial tasks to perform within the distributed management software of the client-server system, i.e. they are delegated specific services to "provide". In a CLARiiON® storage system marketed by EMC Corporation, such providers may include: directory provider, persistence (file replication) provider, security provider, snapshot copying (backups and data modeling) provider, mirroring (permanent backup storage) provider, clone (local replication) provider, LUN provider (creates or destroys LUNs), meta LUNs (virtualization) provider, etc. Each provider is concerned only with performing its own prescribed task. These providers are, of course, software entities, but they may be modular in design. They can, therefore, be modularly "plugged" into a software framework allowing easily-made additions to, or reductions of, the overall functionality of the storage system's management software. These providers act upon objects and although each provider is concerned with performing only its own task, it may act upon one or more objects that are also being acted upon by other providers.

As noted, it is important to have this management software run as efficiently as possible. In order to manage various components of a client-server network such as a storage network, there has to be frequent, if not continuous, monitoring of operation of at least the important objects comprising various critical aspects of, for example, a storage system in that storage network. One of the techniques used to monitor objects within an object-oriented network involves "observers" or "observer objects" which are used to observe or monitor "subject objects". When a subject object changes state, it "fires back" an instantaneous indication thereof to a component that is interested in the state change of that subject object. The subject object is the "indication source". The "indication" is the message sent by subject object to observer object, or from server to client, to indicate a change has occurred. The observer or its client can be viewed as an "indication subscriber" or a "subscriber to indications" where the observer observes the change of state and its client is interested in the change. The "indication subscription" is the "request" for the indication or state-change-message, and reflects the interest that the subscriber or client has in the event. The subject object can be grouped with other objects within a package termed a "provider".

That change of state, once detected and communicated by way of this observer or indication technique, can then be managed by the distributed management software. This activity is termed "asynchronous" notification, which is very efficient as contrasted with slower and arguably more complex prior notification techniques which provided each notification only in response to an individual request. Asynchronous notification does not have to wait for an individual request to be made—it employs objects which are set at "hair-trigger" alertness to react simultaneously with observed state changes in their respective subject objects. Asynchronous notifications may now be implemented substantially in accordance with CIM and the WBEM standard. However, despite the improved efficiencies provided by asynchronous notification, shortcomings still abound in the providing of these indications.

Generally, a client in a traditional storage system management software queries a server for information such as storage object properties, storage array configuration and capacity information. Additionally, the client subscribes (or "registers") for receiving indications from a server (e.g. a provider) such that the client may be notified of any change in the information such as storage object deletions, storage object additions, and changes to storage objects so that the client may perform an appropriate action such as generate events and alarms. Generally, a server may poll a component (also referred to as "subsystem") in order to retrieve information regarding a storage object such that any change in the storage object and/or properties of the storage object may be communicated to a client that has subscribed for receiving indications.

Conventionally, any change in the storage object that is being monitored causes an indication to be generated and sent to a client. In such a conventional system, a large number of clients that have subscribed for indications may consume a large amount of network resources. Further, in such a conventional system, a large number of clients may cause a storage system management software to function inefficiently when a large number of indications are received by the clients. Moreover, in such a conventional system, as storage vendors continue to add additional functionality into data storage systems, a storage system management software of a data storage system must manage a large number of storage objects. As a result, in such a conventional system, managing indications for a large number of storage objects may cause a server to send a large number of indications to a client which in turn may cause a failure in the client such as shutdown of a client application. Further, in such a conventional system, managing a large number of indications may cause a client to stop responding to requests from users.

By contrast, in at least some implementations in accordance with the technique as described herein, sending an indication to a client by associating a bulk status upon determining whether a number of indications processed by a server exceeds a threshold value allows the client to effectively manage indications by performing an appropriate action based on the bulk status associated with the indication. Further, in at least some implementations in accordance with the technique as described herein, upon exceeding a threshold value, only a single indication is provided to a client instead of sending a storm of indications.

In at least some implementations in accordance with the technique as described herein, an indication framework in a server (e.g., provider) allows a user to define a threshold for a storage class and/or for a property of the storage class such that a number of indications that may be provided to a client is reduced during each poll request processing based on the value of the threshold. If a number of indications generated for a storage object being monitored (e.g., a storage class, a property of a storage class) exceeds a threshold value associated with the storage object, only a single indication is provided to a client during a specific poll interval regardless of the number of notifications that are received from the storage object during the specific poll interval. The indication that is provided to the client after the number of notifications exceeds the threshold value is associated with a bulk status (such as a bellwether flag) for indicating to the client (or "subscriber") that a large number of notifications have been generated for the storage object. The client may then choose and perform an appropriate action for managing the indication associated with the bulk status.

In at least some implementations in accordance with the technique as described herein, the use of the managing indications in data storage systems can provide one or more of the following advantages: reducing an amount of overhead involved for a server in managing indications by reducing the number of indications generated for each storage object, reducing an amount of overhead involved for a client in managing indications by receiving a single indication for each storage object in a specific time interval, improving data storage system performance by adding a logic for managing a large number of indications in a server of the data storage system instead of adding similar logic in different subscribers that communicate with the server, and increasing storage system availability by efficiently recovering from a failure or an imminent failure when a client performs an action for managing an indication based on a bellwether flag associated with an indication.

Figure 1:
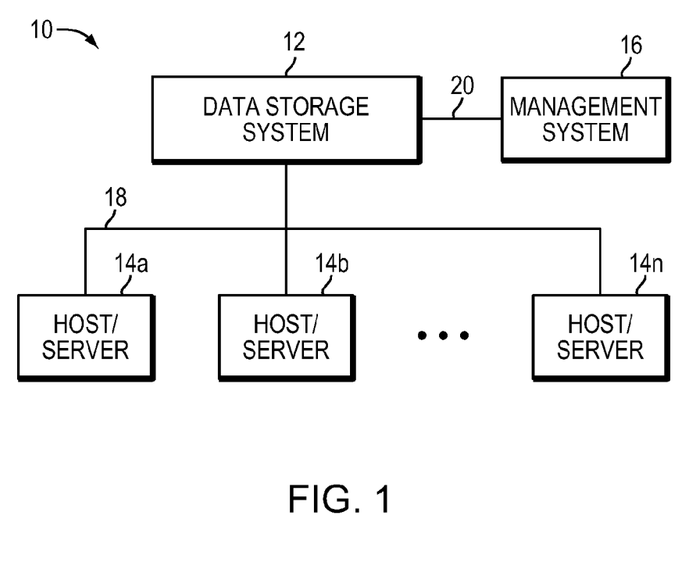
FIG. 1 is an example of an embodiment of a computer system that may utilize the techniques described herein.

Referring to FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In connection with an embodiment in which the data storage 12 is an appliance including hardware and software, the appliance may also include other software for performing different data services. In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the technique as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
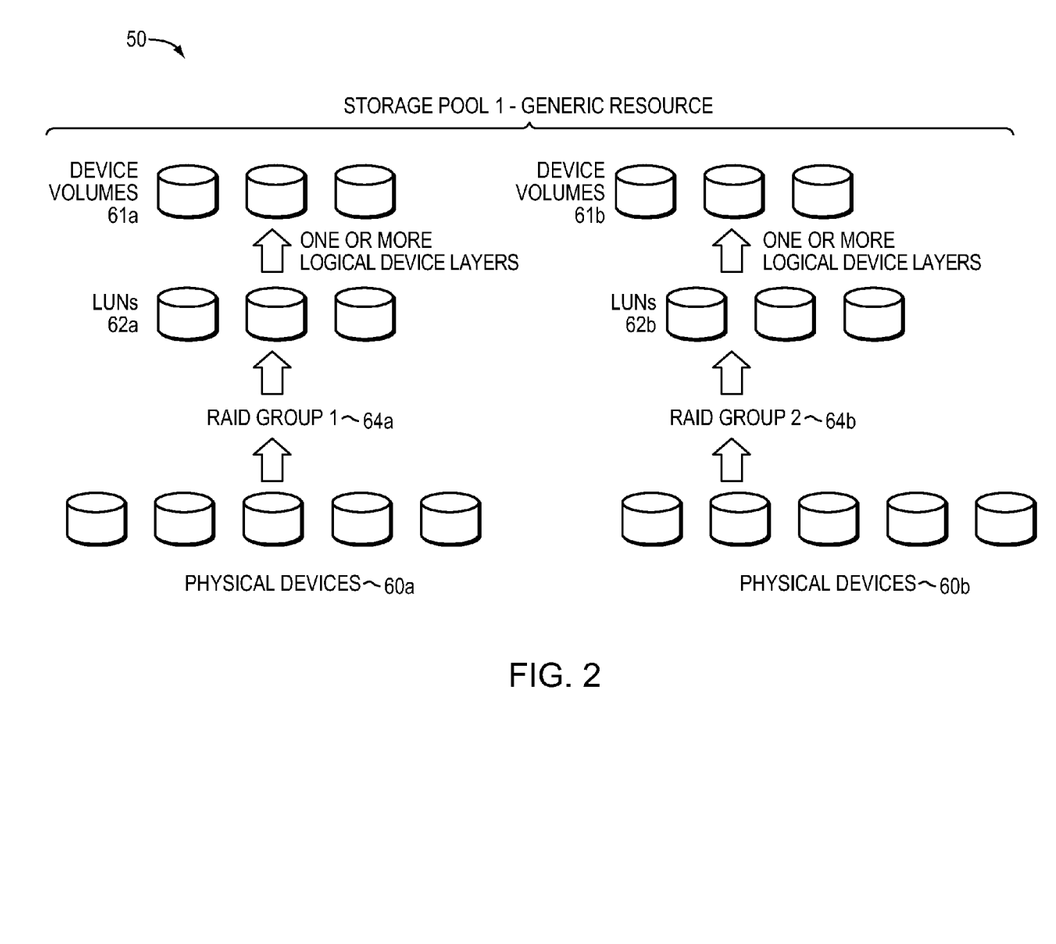
FIG. 2 is an example illustrating storage device layout.

FIG. 2 illustrates one of the many ways of organizing storage from a group of physical devices in the data storage system. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

Figure 3:
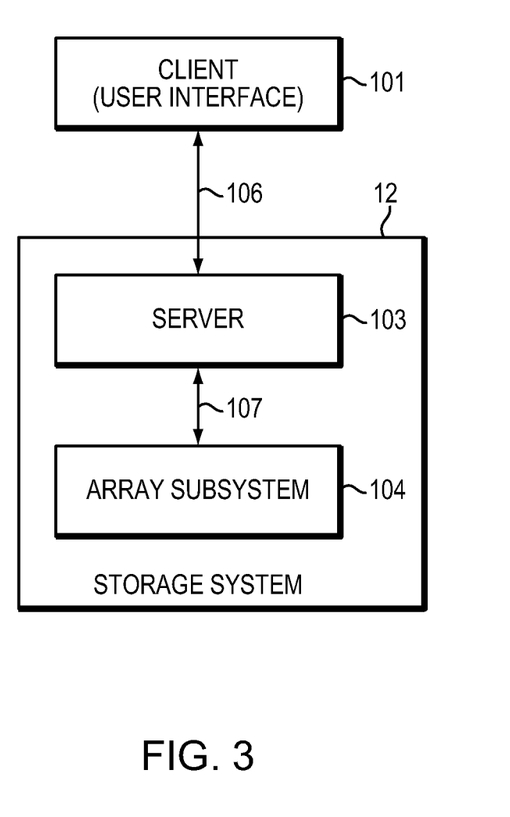
FIGS. 3-6 are block diagrams illustrating in more detail components that may be used in connection with techniques herein.

Referring to FIG. 3, shown is a detailed representation of components that may be included in an embodiment using the techniques described herein. Client 101 may be a typical workstation or graphical user interface (GUI) operatively coupled to data storage system 12. This coupling can be achieved via link 106 which can be, for example, a hyper text transfer protocol (HTTP) link. Storage system 12 includes management server 103 operatively coupled to array subsystem 104 by way of link 107 which can be, for example, an IOCTL protocol link (IOCTL means Input/Output Control, which is a well known protocol or special application programmers' interface for passing messages between software processes). Server 103 receives input requests, from Client 101 and serves-up responses to those requests from array subsystem 104. A request can be coded in, for example, XML language. Array subsystem 104 may be a typical RAID configuration.

Figure 4:
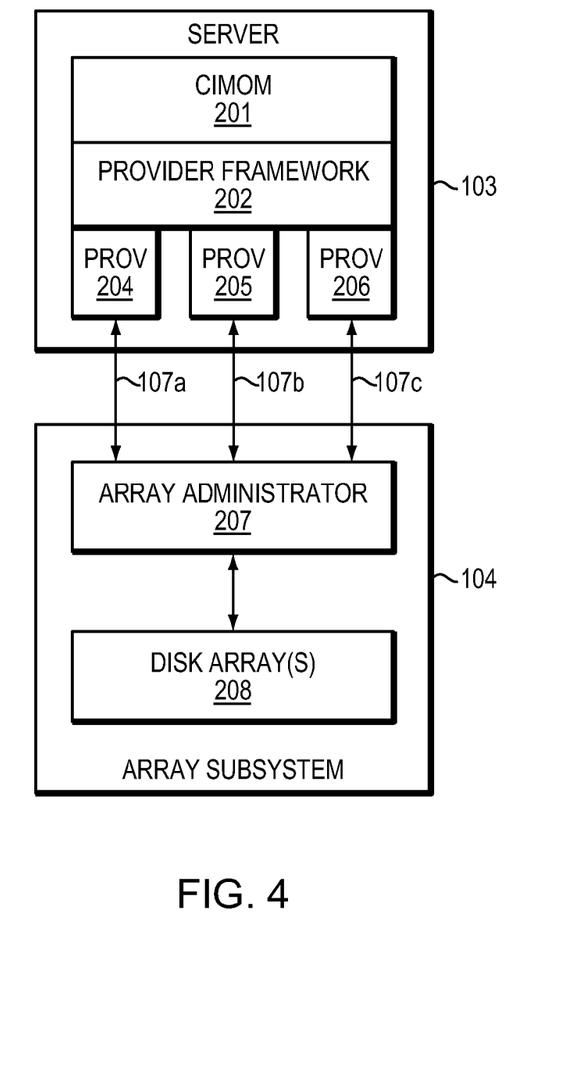

Referring to FIG. 4, shown is a more detailed representation of components that may be included in an embodiment using the techniques described herein. With reference also to FIG. 3, server 103 includes CIMOM 201, provider framework 202 and a number of providers 204-206. It should be understood that many more, or fewer, providers can be used. Array subsystem 104 includes an array administration interface or array administrator 207 and disk array(s) 208. CIMOM 201 is an object manager configured in accordance with the Storage Network Industry Association Common Information Model (SNIA/CIM) standard or protocol and receives requests from client 101. CIMOM 201 provides a framework for services offered by providers that plug into it, such as provider framework 202 with which it is operatively coupled. A provider is a plug-in into the CIMOM that provides a specific service, such as managing a storage feature. Each of the providers 204-206 is software functionality which acts independently on its own set of objects.

Providers 204-206 may be implemented as dynamic link libraries (DLLs) loaded into the CIMOM process. Accordingly, they can "plug in" to provider framework 202 in a modular fashion and are thereby communicatively coupled to CIMOM 201. The providers may also be communicatively coupled to each other through CIMOM 201. Providers 204-206 may be removed, depending on whether or not their functionality is essential for operation of the system and others (not shown) may be added by plugging-in to framework 202.

Array administrator or administration interface 207 is the interface through which all storage system management is performed, regardless of which array feature or driver may be targeted. Providers 204-206 are communicatively coupled by way of inter-process communication links 107a-107c to array administration interface 207. Thus, on the client side of the interface, it may be accessed using application programmer interface (API) calls. On the array side of the interface it may use IOCTL calls to communicate with managed drivers. Link 209 operatively couples array administrator 207 to disk array (s) 208 which, therefore, can be an IOCTL link.

A storage management software application may use a CIM client to connect to a CIMOM 201, to retrieve information about the storage entities that the CIMOM manages, and also to perform active configuration of the storage entities. Storage management software that uses a CIM client may be called a CIM client application that may be accessed by UI 101. A user issues a storage management operation using UI 101, which in turns, sends a request to CIMOM 201. OSLS (Open Storage Layer Sharp) is an object-oriented, cross-platform C++ API for developing management applications that can interact with storage resources, such as storage devices, switches, servers, and the like. PSM (Persistent Storage Manager) is a mechanism that enables the data storage system to read and/or write shared persistent files from a storage processor of the data storage system.

Figure 5:
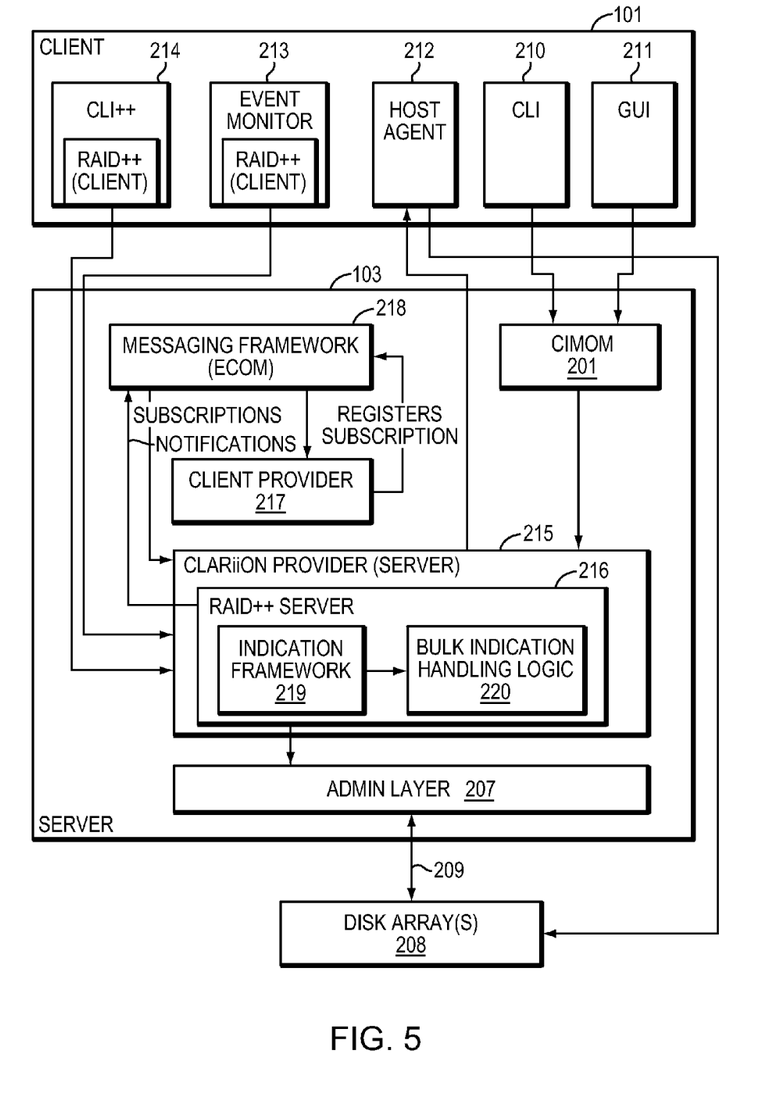

Referring to FIG. 5, shown is a more detailed representation of components that may be included in an embodiment using the techniques described herein. FIG. 5 illustrates a more detailed example of the arrangement described in FIGS. 3-4 showing location and relationships of components to each other. The components may use various communications methods and protocols. Several components of system management reside on host computers and are referred to as client components and are shown in group 101. One component in particular, RAID++, has both a client 214 and server 216 instances, shown respectively in host/client group 101 and server group 103. Other components include the Command Line Interface (CLI) 210, the Graphical User Interface (GUI) 211, the host agent 212, and the event monitor 213.

The server side management components shown in group 103 interact with the user interfaces and tools for administering system configuration and operation and to report on the system operation. The server side components are comprised of middleware which resides between a user and storage management components of the system which implement management system storage features. The server side components are basically divided into two groups, the legacy RAID++ module which provides the majority of the management services and the CIMOM and its providers. The RAID++ module uses a proprietary transport to communicate with management clients. The RAID++ module maintains an object model of the storage system 12 that it uses for managing the storage system 12; it updates the model repeatedly (e.g., periodically) by polling the system 12. The CIMOM CLARiiON® provider 215 is essentially a wrapper for the RAID++ classes and methods and translates GUI initiated CIM XML commands into calls to RAID++ to fulfill requests from client 101. The management functions not provided by RAID++ 216 are provided by series of CIMOM providers which are attached to CIMOM 201. The CIMOM 201 provides common infrastructure services such as XML coding/decoding and HTTP message transport.

The above-described providers periodically poll the system infrastructure to build and update a model of the existing component configuration and status. If any changes are detected in configuration or status from the existing model, registered observers are notified of the changes and the model is updated with the new model and saved for queries by the client provider 217. The services of these providers can be accessed from other providers by formulating XML requests and sending them to the CIMOM 201. This permits providers which require the services of other providers (such as RAID++ through the CLARiiON® Provider 215 or the CIM local services (such as persistent storage, directory services, or security) to access those services.

As shown in FIG. 5, through an operating system/driver, array administration interface 207 ("admin layer") receives property data pertaining to a storage entity (also referred to as "storage object"). Admin layer 207 makes information derived from such property data available to server provider 215. A client such as client provider 217 registers for receiving indications by sending a subscription request to server provider 215 via a messaging framework such as ECOM 218. The server provider 215 then notifies the client provider 217 regarding any change in a storage entity such as change in a property of the storage entity.

An indication framework 219 is functionally positioned between a client and a server with respect to communicating an indication from the server to the client. Any indications sent solely between any provider on server 103 and any other provider on server 103 operate under a common process, such as CIMOM running on server 103 and therefore such indications may be method calls.

In operation, after client 101 and server 103 establish a connection as described earlier in reference with FIG. 3, client 101 subscribes to indications in server 103. In other words, client 101 requests that objects of interest to that client provide indications about when each of those objects has a state change. In at least one embodiment of the current technique, this subscription, or registration for indication, operation may be processed in extensible markup language (XML). A state change can be an events such as a failure, a degradation, an addition or deletion of a quantity to or from an object, and a change in a property of an object. For example, if client 101 had subscribed to an indication for a storage object, then in the graphical user interface or GUI 211 associated with client 101 an icon is displayed corresponding to the storage object. If the storage object is, for example, a LUN, and if there is no fault with that LUN, the icon would typically be gray color. But, if there is a fault with that LUN the icon is supposed to have changed on the GUI to another color, typically red. This change in color would signal to the user that there is a fault in that LUN. In order to achieve this communication with the client's GUI, the following operation is undertaken.

For example, indication framework 219 is focused on, or attuned-to filter settings of, LUN storage object, although indication framework 219 could also simultaneously be focused on other storage objects. At the moment that LUN object changes state, for example, changes from faultless to faulted state, indication framework 219 processes that state change indication. Indication framework 219 has a lookup table (not shown) to which it refers and will find all clients in its table that are interested in this state change. Indication framework 219, in this instance, may find an observer object in its table and which happens to be interested in that state change. The observer object via indication framework 219 notes that this LUN's property "IS FAULTED" has changed from "false" to "true" indicating a fault. The observer object and indication framework 219, running under the CIMOM 201 which is running on server 103, thereby inherently advise the messaging framework ECOM 218 via a notification that the state has changed for LUN object.

As noted above, indication framework 219 is aware of the state change which occurred in LUN storage object and, therefore, applies the IS FAULTED property to an indication filter. The indication filter reflects interest by a client in only particular indications. For example, if the filter reflects no interest by the client in state changes in the LUN storage object, then the indication filter prevents the firing back of such state change indications. On the other hand, if the filter does reflect interest by its client 101 in state changes in the LUN storage object, then the filter allows the firing back of such state change indication to client 101. Accordingly, after processing this indication in client 101, the LUN icon on the user interface 211 associated with client 101 will turn from gray to red indicating a fault.

In at least one embodiment of the current technique, bulk indication handling logic 220 prevents sending a storm of indications when a number of indications associated with a storage object crosses a threshold value.

Figure 6:
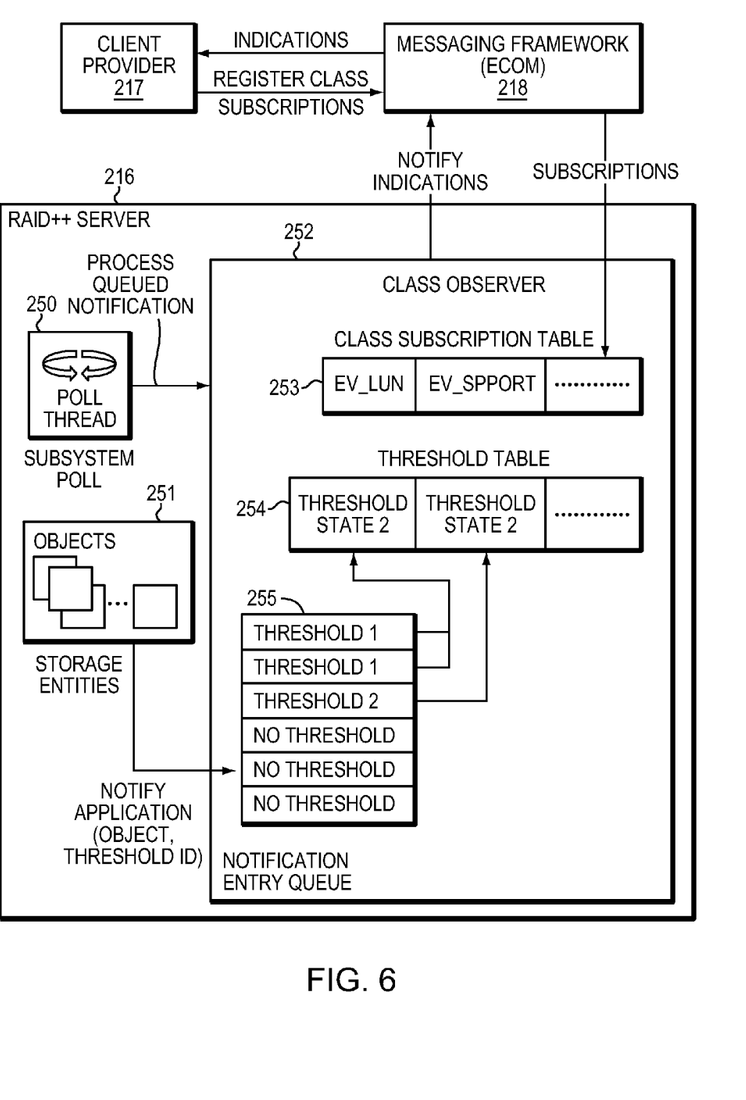

Referring to FIG. 6, shown is a detailed flow diagram illustrating a flow of data in the data storage system. Client provider 217 (also referred herein as simply "client") connected to server 216 in data storage system 12 creates a usage context such that the server 216 provides storage information of the data storage system 12 that is relevant to the usage context of the client. Storage information reported by a data storage system may include information associated with a set of storage objects (also referred herein as "storage entities"). A storage entity is a storage object such as a LUN, file system, array, port. In at least one embodiment of the current technique, data storage system 12 provides storage system information associated with storage devices of disk array 208 to client 217 based on a usage context provided by the client. Further, the client 217 updates the usage context each time the client 217 detects a change in storage objects associated with the usage context. Data storage system 12 uses information of a usage context to appropriately filter storage system information of storage devices and provides a subset of the storage system information to the client 217 such that the subset of the storage information provided is relevant to the usage context of the client 217.

In at least one embodiment of the current technique, client provider 217 may be implemented as a dynamically loadable library (e.g., a DLL on Microsoft® Windows™, a share library on Linux). Further, client provider 217 may also be implemented as a dynamically loadable library in order to leverage a modular generic framework for querying provider components (e.g., CLARiiON® provider 215), and subscribing to indications. Further, client provider 217 reports storage system information (e.g., storage topology, configuration information) of the disk array 208 and storage entities of data storage system 12 to users of the client 217 based on a usage context of a session established between the server 216 and client 217.

Storage system information associated with storage entities of data storage system 12 is retrieved by a polling process 250 which is invoked repeatedly at a specific time interval. A poll thread (also referred to herein as "poll process") coordinates the polling process such that the polling process processes indications queued in a notification entries queue 255. In order to process indications, class "observer" 252 receives an indication notification from a storage entity 251, and adds the indication to the notification entries queue 255 in order to ensure that indications are processed in an ordered arrangement. The poll thread removes an indication from the notification entries queue 255 and processes the indication.

In at least one embodiment of the current technique, with respect to indication processing functionality, an object of storage objects 251 may be depicted as a generic software object and may be, for example, a LUN object. Client provider 217 sends a request to server 216 for registering a subscription in the subscription table 253. The request to register the subscription is send using messaging framework ECOM 218. Client 217 may register a subscription for receiving an indication regarding a change in a storage object associated with a storage class or storage entity. Further, the change in a storage object may also include a change in a property of the storage object. The subscription table 253 stores information regarding storage classes for which client 217 may register subscriptions for receiving indications. A storage object may be an instance of a storage class such that the storage object sends a notification regarding a change in the storage object and/or a change in a property of the storage object to class observer 252. Further, threshold table 254 is used for processing notifications received from storage objects. The threshold table 254 includes information such as a threshold value, an identifier and a threshold state for each storage class and/or a property of the storage class. For example, the threshold table 254 may also include a number of indications allowed during each poll request for each storage class subscribed by client provider 217, the current count of notifications received for each storage object, and the state (e.g., threshold exceeded, threshold not exceeded). Upon a change in a storage object, the storage object sends a notification to class observer 251. The notification includes a threshold identifier such that the threshold identifier may be looked up in threshold table 254. The notification reports a change in a property of a storage object associated with a storage class. Upon receiving the notification, class observer 252 verifies whether a subscription exists for the storage class in subscription table 253 indicating that if client 217 is interested in receiving an indication for the storage class. Then, threshold information stored in threshold table 254 is evaluated in order to determine whether the number of notifications received so far for the storage class has exceeded the threshold value associated with the storage class. If the number of notifications received for the storage class during that poll cycle has exceeded the threshold value associated with the storage class, the notification is ignored and not added to the notification entries queue 255. However, if the number of notifications has just exceeded the threshold value, an entry is added to the notification entries queue 255 and a bulk status (such as a bellwether flag) is associated with the entry. On the other hand, if the number of notifications has not exceeded the threshold value, an entry is added to the notification entries queue 255.

In at least one embodiment of the current technique, a bellwether status (also referred to herein as "flag") associated with a storage object may be displayed as an icon displayed in a graphical user interface which may indicate to a user that a large number of indications or events have occurred for the storage object. Thus, the bellwether status may indicate an imminent problem or a failure that may be resolved by performing an appropriate action. As a result, upon receiving the bellwether status, a user may decide how to manage an event indicating a large number of storage object changes without receiving a large number of notifications associated with the changes.

A poll process 250 processes notifications that are queued in notification entries queue 255 during each poll cycle. The poll process iterates through each queued notification entry in the notification entries queue 255, evaluates information stored in threshold table 254, and determines whether the total number of notifications received for each entry exceeds a threshold value. If the total number of notifications exceeds the threshold value for an entry, the entry is ignored and not processed for generating an indication for the client 217. However, if the total number of notifications does not exceed the threshold value for an entry, the entry is processed for generating an indication that is provided to client 217. At the end of the poll processing, information of the threshold table 254 is reset in order to start processing for the next poll cycle.

In at least one embodiment of the current technique, class observer 252 sends indications to client 217 using messaging framework (ECOM) 218 such that the messaging framework 218 provides the indications to clients that have subscribed for receiving the indications. For example, class observer 252 may provide a callback functionality that invokes a notify function of the messaging framework 218 such that the callback functionality may be implemented in server provider 215. A callback may provide a storage object and a bulk status (e.g., a bellwether flag) associated with the storage object to messaging framework 218.

Figure 7:
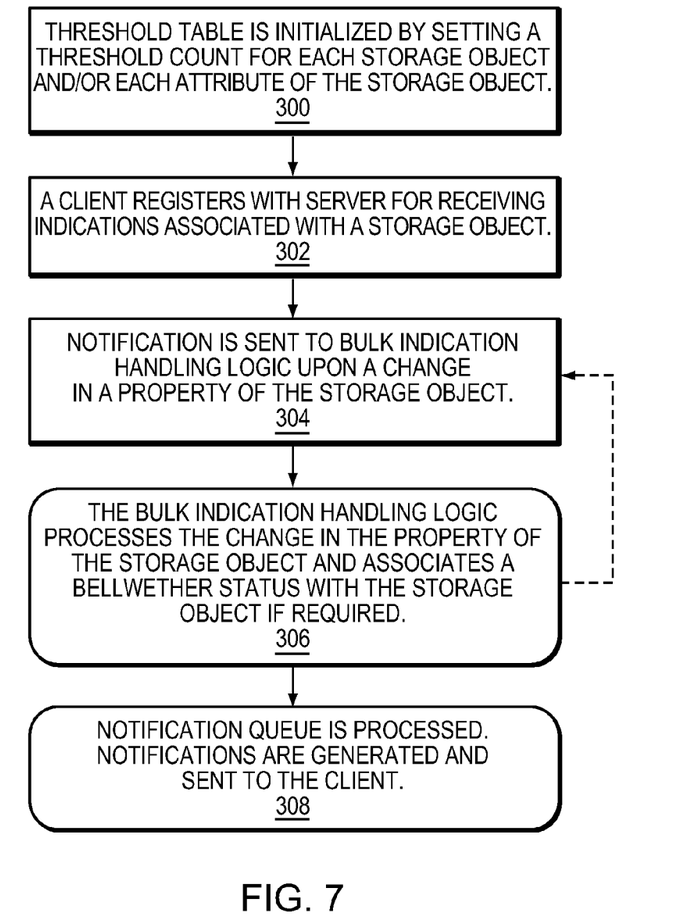
FIG. 7-9 are flow diagrams illustrating processes that may be used in connection with techniques herein.

Referring to FIG. 7, shown is a flow diagram illustrating a flow of data in the data storage system. With reference also to FIGS. 5 and 6, a threshold table is initialized by setting a threshold value for each storage object and/or each attribute (or property) of the storage object (step 300). A client 217 registers a subscription with server 216 (e.g. RAID++ server) for receiving indications associated with a storage class (step 302). Upon a change in the storage object, a notification is provided to bulk indication handling logic 220 for processing the notification (step 304). The bulk indication handling logic 220 processes notifications for the storage object and associates a bulk status (such as a bellwether flag) with the storage object based on the threshold value (step 306). The notifications are added to notification entries queue 255, and processed. Based on the processing, indications are created and provided to client 217 (step 308). If an entry of the notification entries queue 255 is associated with a bellwether flag, an indication is provided to client 217 along with the bulk status.

Figure 8:
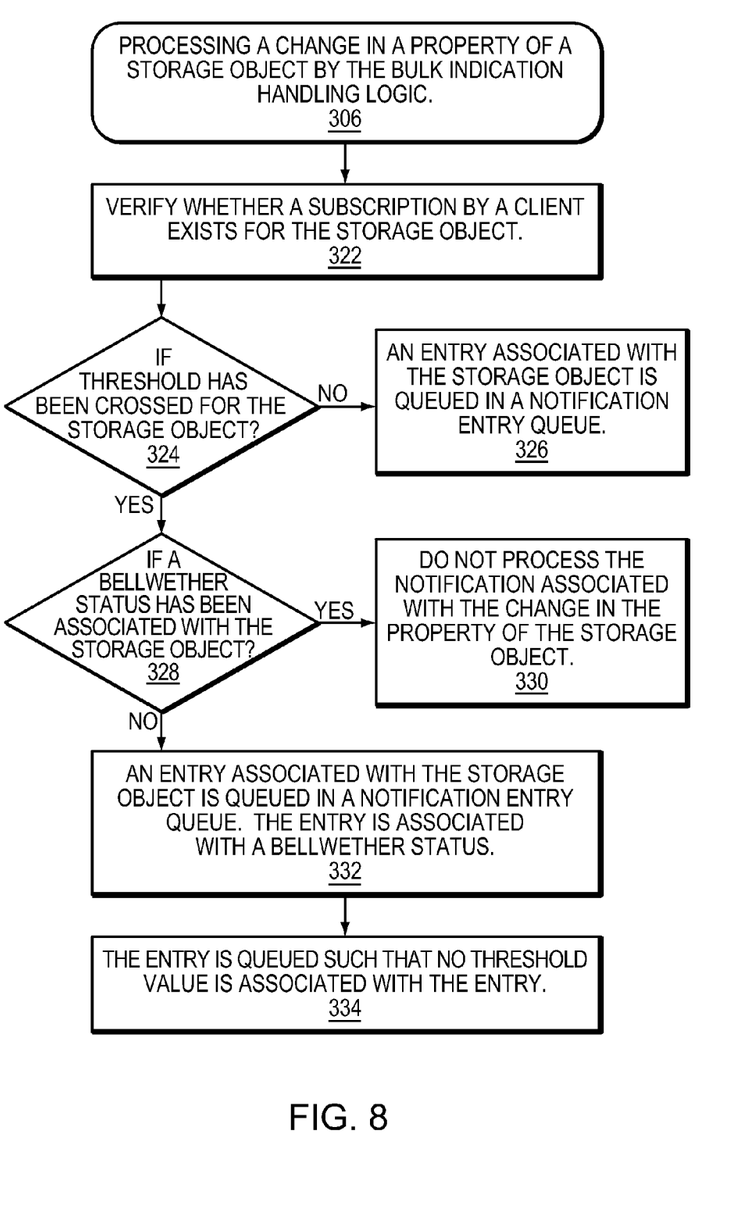

Referring to FIG. 8, shown is a flow diagram illustrating processing of a notification by bulk indication handling logic in the data storage system. With reference also to FIGS. 5-7, upon receiving a notification for a change in a storage object, bulk indication handling logic 220 verifies whether client 217 has subscribed for receiving an indication for the storage class and/or properties of the storage class associated with the storage object (step 322). If client 217 has subscribed for receiving indications, threshold table 234 is checked to determine whether the number of notifications received for the storage object exceeds a threshold value associated with the storage object (step 324). If the number of notifications does not exceed the threshold value, an entry is added to notification entries queue 255 (step 326). If the number of notifications exceeds the threshold value and a bulk status (e.g., a bellwether flag) has already been associated with the storage object, the notification is ignored and not processed (step 330). However, if the number of notifications exceeds the threshold value but a bulk status (e.g., a bellwether flag) has not been associated with the storage object, an entry is added to the notification entries queue 255, and the bulk status is associated with the entry (step 332). Further, the entry is updated to indicate that that the threshold value is no longer associated with the entry during that poll cycle (step 334).

Figure 9:
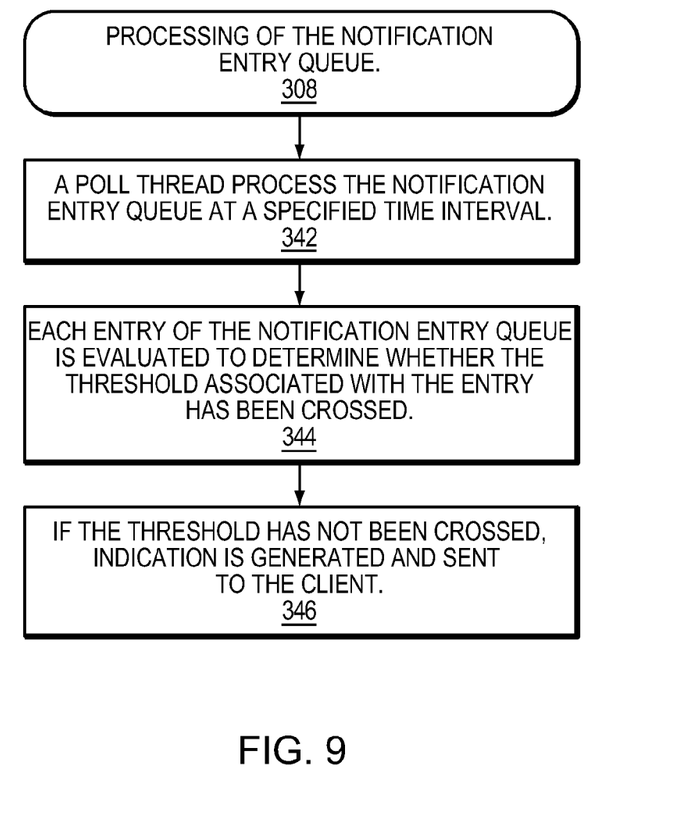

Referring to FIG. 9, shown is a flow diagram illustrating processing of the notification queue in the data storage system. With reference also to FIGS. 5-7, a poll thread processes the notification entries queue 255 regularly at a specific time interval (step 342). Each entry of the notification queue 355 is evaluated to determine whether the current number of notifications has exceeded a threshold value associated with the entry (step 342). If the threshold value has not been exceeded, an indication is generated and provided to client 217 (step 346). Further, once the number of notifications for a storage object exceeds a threshold value associated with the storage object, only a single indication is provided to the client 217 such that a bellwether flag is associated with the notification. As a result, the client 217 does not receive a flood of indications. However, the client 217 is notified via the bellwether status that the number of notifications indicating changes to the storage object exceeds a certain threshold value.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing indications in data storage systems, the method comprising:
   associating a threshold value with a storage object, wherein a client subscribes to a server for receiving an indication indicating a change in a property of the storage object;
   determining whether a number of indications processed by the server exceeds the threshold value;
   based on the determination, associating a bulk status with the indication; and
   sending the indication to the client, wherein the client performs an action based on the bulk status associated with the indication.

2. The method of claim 1, wherein the bulk status is a bellwether flag, wherein the bellwether flag indicates the number of indications and is displayed to the client via a user interface.

3. The method of claim 1, wherein the storage object is selected from the group consisting of a logical unit number (LUN), a file, a storage array and a port.

4. The method of claim 1, further comprising:
   initializing a threshold table, wherein the threshold table includes a threshold count for the storage object, an identifier for the storage object, and a threshold state for the storage object.

5. The method of claim 1, further comprising:
   associating a threshold value with a property of the storage object.

6. The method of claim 1, further comprising:
   updating a class subscription table upon receiving a subscription request from the client for receiving the indication.

7. The method of claim 1, wherein if the number of indications does not exceed the threshold value, the method further comprising:
   adding the indication to a notification entry queue.

8. The method of claim 1, wherein if the number of indications exceeds the threshold value, the method further comprising:
   determining whether the bulk status is associated with the indication;
   based on the determination of whether the bulk status is associated with the indication, avoid sending the indication to the client.

9. The method of claim 1, wherein a poll process processes the number of indications based on a poll time interval.

10. A system for use in managing indications in data storage systems, the system comprising:
    a processor;
    first logic associating a threshold value with a storage object, wherein a client subscribes to a server for receiving an indication indicating a change in a property of the storage object;
    second logic determining whether a number of indications processed by the server exceeds the threshold value;
    third logic associating, based on the determination, a bulk status with the indication; and
    fourth logic sending the indication to the client, wherein the client performs an action based on the bulk status associated with the indication.

11. The system of claim 10, wherein the bulk status is a bellwether flag, wherein the bellwether flag indicates the number of indications and is displayed to the client via a user interface.

12. The system of claim 10, wherein the storage object is selected from the group consisting of a LUN, a file, a storage array and a port.

13. The system of claim 10, further comprising:
    fifth logic initializing a threshold table, wherein the threshold table includes a threshold count for the storage object, an identifier for the storage object, and a threshold state for the storage object.

14. The system of claim 10, further comprising:
    fifth logic associating a threshold value with a property of the storage object.

15. The system of claim 10, further comprising:
    fifth logic updating a class subscription table upon receiving a subscription request from the client for receiving the indication.

16. The system of claim 10, wherein if the number of indications does not exceed the threshold value, the method further comprising:
    fifth logic adding the indication to a notification entry queue.

17. The system of claim 10, wherein if the number of indications exceeds the threshold value, the method further comprising:

fifth logic determining whether the bulk status is associated with the indication;

sixth logic avoid sending, based on the determination of whether the bulk status is associated with the indication, the indication to the client.

18. The system of claim 10, wherein a poll process processes the number of indications based on a poll time interval.

* * * * *